United States Patent
Asada

(10) Patent No.: US 12,139,623 B2
(45) Date of Patent: Nov. 12, 2024

(54) OIL-BASED INK COMPOSITION FOR WRITING BOARD AND MARKING PEN INCORPORATING SAME

(71) Applicants: KABUSHIKI KAISHA PILOT CORPORATION, Tokyo (JP); THE PILOT INK COMPANY, LIMITED, Aichi (JP)

(72) Inventor: Katsuhisa Asada, Anjou (JP)

(73) Assignees: KABUSHIKI KAISHA PILOT CORPORATION, Tokyo (JP); THE PILOT INK COMPANY, LIMITED, Aichi (JP)

( * ) Notice: Subject to any disclaimer, the term of this patent is extended or adjusted under 35 U.S.C. 154(b) by 1024 days.

(21) Appl. No.: 17/049,661

(22) PCT Filed: Apr. 24, 2019

(86) PCT No.: PCT/JP2019/017328
§ 371 (c)(1),
(2) Date: Oct. 22, 2020

(87) PCT Pub. No.: WO2019/208603
PCT Pub. Date: Oct. 31, 2019

(65) Prior Publication Data
US 2021/0253886 A1 Aug. 19, 2021

(30) Foreign Application Priority Data
Apr. 27, 2018 (JP) .................... 2018-086201

(51) Int. Cl.
| C09D 11/16 | (2014.01) |
| B43K 8/02 | (2006.01) |
| C08K 3/013 | (2018.01) |
| C08K 5/00 | (2006.01) |
| C08K 5/05 | (2006.01) |
| C08K 5/12 | (2006.01) |
| C08L 29/14 | (2006.01) |

(52) U.S. Cl.
CPC .............. C09D 11/16 (2013.01); B43K 8/02 (2013.01); C08K 3/013 (2018.01); C08K 5/0041 (2013.01); C08K 5/05 (2013.01); C08K 5/12 (2013.01); C08L 29/14 (2013.01)

(58) Field of Classification Search
CPC ........ C09D 11/16; C08K 5/12; C08K 5/0041; C08K 5/05; C08K 3/013; B43K 8/02; C08L 29/14
See application file for complete search history.

(56) References Cited

U.S. PATENT DOCUMENTS

| 5,316,574 A | 5/1994 | Fujita et al. .................. 106/20 |
| 5,324,764 A | 6/1994 | Fujita et al. .................. 524/377 |
| 7,591,887 B2 | 9/2009 | Bédat et al. |
| 2006/0178446 A1* | 8/2006 | Bedat .................. C09D 11/03 106/31.86 |
| 2016/0177114 A1* | 6/2016 | Shiobara .................. B43K 7/02 401/209 |

(Continued)

FOREIGN PATENT DOCUMENTS

| EP | 3046978 A1 | 7/2016 |
| EP | 3046978 B1 * | 3/2017 ............. C09D 11/18 |

(Continued)

OTHER PUBLICATIONS

European Search Report dated Dec. 20, 2021 for EP19793131.4.
International Search Report mailed Jun. 4, 2019 in related application No. PCT/JP2019/017328.

*Primary Examiner* — Sophie Hon
(74) *Attorney, Agent, or Firm* — Renner, Kenner, Greive, Bobak, Taylor & Weber Co., LPA

(57) ABSTRACT

The present invention provides: a highly practical and safe oil-based ink composition for a writing board, said composition being capable of imparting high mark-erasability and having excellent resistance to drying up; and a marking pen incorporating the same. Specifically, the present invention provides: an oil-based ink composition for a writing board, said composition containing a pigment, an organic solvent, a resin, and at least one compound selected from compounds represented by general formula (1) or (2); and a marking pen obtained by incorporating the oil-based ink composition for a writing board. (In the formulae, $R^1$-$R^4$ each represent a C6-18 alkyl group or a C2-18 and O2-10 alkoxypolyglycol group.)

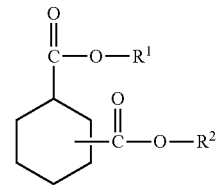

(1)

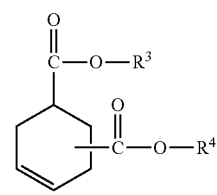

(2)

2 Claims, No Drawings

(56) References Cited

U.S. PATENT DOCUMENTS

2017/0313850 A1    11/2017   Pfeiffer et al. ......... C08K 15/12

FOREIGN PATENT DOCUMENTS

| JP | 2795917 B2 * | 8/1998 | |
|----|----|----|----|
| JP | 2005075893 A | 3/2005 | ............ C09D 11/16 |
| JP | 2010090247 A | 4/2010 | ............ C09D 11/16 |
| JP | 2012111929 A * | 6/2012 | |
| JP | 2017115088 A | 6/2017 | ............ B43K 19/02 |
| JP | 2017218503 A | 12/2017 | ............... B43K 8/02 |
| JP | 7307719 B2 * | 7/2023 | ............... B43K 8/02 |
| WO | WO 2013/137147 A1 | 9/2013 | ........... C09D 133/10 |
| WO | 2015036621 A1 | 3/2015 | |

* cited by examiner

OIL-BASED INK COMPOSITION FOR WRITING BOARD AND MARKING PEN INCORPORATING SAME

CROSS-REFERENCE TO RELATED APPLICATION

This is a § 371 application of International Patent Application No. PCT/JP2019/017328 filed Apr. 24, 2019, which claims the benefit of Japanese Patent Application No. 2018-086201 filed Apr. 27, 2018.

TECHNICAL FIELD

The present invention relates to an oil-based ink composition for a writing board. More specifically, the present invention relates to an oil-based ink composition for a writing board, which is highly safe and excellent in resistance to dry-up of a pen tip, and a marking pen incorporating the same.

BACKGROUND ART

Conventionally, an oil-based ink for a writing board that is written on a writing board made of a material such as vitreous enamel, metal, or plastic (so-called whiteboard) is added with a resin for imparting fixability of the handwriting formed on the writing board as well as a release agent for making it possible to rub and erase the handwriting with a board eraser (erasing member made of non-woven fabric such as felt, or pile) (see, for example, Patent Literatures 1 and 2).

Conventionally, phthalic acid esters have been widely used as the release agent described above, but safety concerns have arisen in recent years, so that higher fatty acid esters such as cetyl isooctanoate are widely used as an alternative material (see, for example, Patent Literatures 3 and 4).

CITATION LIST

Patent Literatures

Patent Literature 1: Japanese Patent Application Publication No. Hei 5-194904
Patent Literature 2: Japanese Patent Application Publication No. Hei 5-194903
Patent Literature 3: Japanese Patent Application Publication No. 2010-90247
Patent Literature 4: Japanese Patent Application Publication No. 2005-75893

The higher fatty acid esters such as cetyl isooctanoate have no safety concerns and can provide erasing performance as a release agent, but have a tendency that it becomes difficult to obtain the handwriting erasability and an unerased residue is generated at the time of rubbing and erasing, depending on the material of the writing board or after the handwriting is stored for a long period following the handwriting.

In addition, when used in combination with a polyvinyl butyral resin, which is preferably used because it is possible to obtain an appropriate fixability to the writing board and pigment dispersibility, the higher fatty acid esters tend to have low compatibility and have a lowered handwriting density when the handwriting is dried, and therefore improvement is desired.

SUMMARY OF INVENTION

Problems to be Solved by the Invention

The present invention provides a highly practical oil-based ink composition for a writing board, which is capable of imparting high handwriting erasability without safety concerns and is excellent in dry-up resistance, and a marking pen incorporating the same.

In particular, the present invention provides an oil-based ink composition for a writing board, which is excellent in handwriting performance, in which the compatibility is not lowered and the handwriting density is not lowered when the handwriting is dried even when used in combination with a polyvinyl butyral resin, and a marking pen incorporating the same.

Means for Solution of the Problems

The present invention provides an oil-based ink composition for a writing board, comprising: a pigment; an organic solvent; a resin; and one or more compounds selected from compounds represented by the following general formulas (1) and (2)

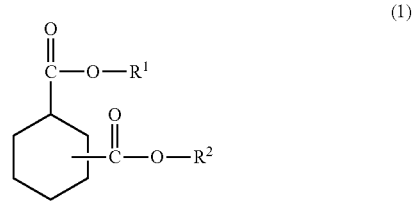

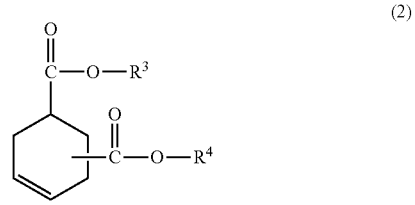

wherein $R^1$ to $R^4$ are each any of an alkyl group having 6 to 18 carbon atoms and an alkoxy polyglycol group having 2 to 18 carbon atoms and 2 to 10 oxygen atoms.

A content of the compound is preferably in a range of 1 to 15% by mass based on a total amount of the ink composition. In addition, the organic solvent is preferably one or more selected from ethyl alcohol, n-propyl alcohol, and isopropyl alcohol. In addition, the resin preferably contains a polyvinyl butyral resin. A butyralization degree of the polyvinyl butyral resin is preferably in a range of 58 to 70 mol %, and a hydroxylation degree of the polyvinyl butyral resin is preferably in a range of 30 to 40 mol %.

Moreover, the present invention provides a marking pen incorporating the oil-based ink composition for a writing board.

Advantageous Effects of Invention

The present invention makes it possible to form an ink which have no safety concerns, can maintain a high handwriting erasability even after the handwriting is left for a long period of time, and has better dry-up resistance than conventional ones, thus resulting in a highly practical oil-based ink composition for a writing board capable of achieving both high writing performance and erasing performance, and a marking pen incorporating the same.

Moreover, the solubility is not lowered even when used in combination with a polyvinyl butyral resin, thus resulting in an oil-based ink composition for a writing board, which is excellent in handwriting performance, in which the handwriting density is not lowered when the handwriting is dried, and a marking pen incorporating the same.

DESCRIPTION OF EMBODIMENTS

The present invention adds one or more selected from the compounds represented by the above general formulas (1) and (2) to the ink as a release agent, and thereby can impart high handwriting erasability without safety concerns, and also exhibit an excellent effect in dry-up resistance.

When a butyral resin is used, clear handwriting can be obtained without lowering the handwriting density when handwriting is dried.

The compound represented by the general formula (1) is a cyclohexane dicarboxylic acid ester in which a cyclohexane dicarboxylic acid having a carboxylic acid group at any of the ortho position, the meta position, and the para position is ester-bonded with an alkyl alcohol having 6 to 18 carbon atoms, an alkoxy polyglycol having 2 to 18 carbon atoms and 2 to 10 oxygen atoms, and can exist in the handwriting in a uniform state, making it possible to exhibit a high release effect.

In addition, since the compound has higher compatibility with the polyvinyl butyral resin than higher fatty acids such as cetyl isooctanoate, each does not precipitate even when the solvent evaporates. Therefore, it is difficult to prevent the pigment dispersion by the polyvinyl butyral resin even when the concentration is increased by evaporation of the solvent in the tip portion of the marker pen having a large ink exposure surface. Thus, it is easy to impart dry-up resistance, and even when the pen tip is exposed for a long time, handwriting can be formed without causing blurring during writing.

The alkyl group having 6 to 18 carbon atoms includes a 2-ethylhexyl group, a lauryl group, and an isononyl group. An alkyl group having 6 to 16 carbon atoms is preferable, and an alkyl group having 8 to 14 carbon atoms is more preferable. In addition, the alkyl group having 6 to 18 carbon atoms is preferably liquid at room temperature and may be a branched alkyl group or a linear alkyl group.

The alkoxy polyglycol group having 2 to 18 carbon atoms and 2 to 10 oxygen atoms is a group represented by R—(O—(CH$_2$)$_{n1}$)$_{n2}$—O— [in the formula, R represents an alkyl group, n1 is 1 to 4, and n2 is 1 to 9]. The alkoxy polyglycol group having 2 to 18 carbon atoms and 2 to 10 oxygen atoms includes a methoxypropanol group, a methoxydipropanol group, and an ethoxydiglycol group. An alkoxy polyglycol group having 2 to 16 carbon atoms and 2 to 10 oxygen atoms is preferable, and an alkoxy polyglycol group having 2 to 12 carbon atoms and 2 to 6 oxygen atoms is more preferable. In addition, the alkoxy polyglycol group having 2 to 18 carbon atoms and 2 to 10 oxygen atoms is preferably liquid at room temperature, and the alkoxy group may be a branched alkoxy group or a linear alkoxy group.

The compound represented by the general formula (2) is a cyclohexane dicarboxylic acid ester in which a cyclohexene dicarboxylic acid having a carboxylic acid group at any of the ortho position, the meta position, and the para position is ester-bonded with an alkyl alcohol having 6 to 18 carbon atoms, an alkoxy polyglycol having 2 to 18 carbon atoms and 2 to 10 oxygen atoms, and can exist in the handwriting in a uniform state, making it possible to exhibit a high release effect.

In addition, since the compound has higher compatibility with the polyvinyl butyral resin than higher fatty acids such as cetyl isooctanoate, each does not precipitate even when the solvent evaporates. Therefore, it is difficult to prevent the pigment dispersion by the polyvinyl butyral resin even when the concentration is increased by evaporation of the solvent in the tip portion of the marker pen having a large ink exposure surface. Thus, it is easy to impart dry-up resistance, and even when the pen tip is exposed for a long time, handwriting can be formed without causing blurring during writing.

The alkyl group having 6 to 18 carbon atoms and the alkoxy polyglycol group having 2 to 18 carbon atoms and the oxygen 2 to 10 are the same as those described above for the compound represented by the general formula (1).

In a conventional ink for a writing board, on formation of handwriting, the resin forms a film on the writing surface to fix the handwriting, but the handwriting density is likely to decrease because, when the main solvent absorbs water in a high humidity atmosphere and the solubility of the polyvinyl butyral resin is lowered, the release agent and the polyvinyl butyral resin are largely separated to form a film. The compound represented by the general formula (1) or (2) has a high compatibility with the polyvinyl butyral resin due to its chemical structure. Thus, when the film is formed, it is difficult to separate them from each other, and the release agent is uniformly finely dispersed in the polyvinyl butyral resin film, so that it is possible to prevent the lowering of the handwriting density in a high humidity atmosphere.

The content of the compound represented by the general formula (1) or (2) is preferably 1 to 15% by mass, and more preferably 1.5 to 10% by mass based on the total amount of the ink composition.

Within the above numerical range, the handwriting formed using the ink composition of the present invention can maintain excellent erasability at a higher level, and the cap-off performance can be effectively imparted.

Moreover, if necessary, general-purpose release agents such as carboxylic acid esters, silicone-based surfactants, and nonionic surfactants can be used in combination. For example, it is possible to use compounds such as sulfuric acid ester of polyoxy alkylene alkyl ether, sulfuric acid ester of polyoxy alkylene alkyl aryl ether, polyoxy ethylene alkyl ether phosphates or salts thereof, dibasic acid esters, monobasic acid esters, and polyalkylene glycol esters.

As the pigment, a general-purpose pigment that has been conventionally applied to oil-based inks is appropriately used.

Specifically, the pigment includes carbon black, ultramarine blue, inorganic pigments such as titanium dioxide pigment, azo-based pigments, phthalocyanine-based pigments, indigo pigments, thioindigo pigments, threne pigments, quinacridone-based pigments, anthraquinone-based pigments, threne-based pigments, diketopyrrolopyrrole-based pigments, dioxazine-based pigments, perylene-based pigments, perinone-based pigments, organic pigments such as isoindolinone-based pigments, a metal pigment obtained by treating aluminum powder or the surface of aluminum powder with a coloring resin, a metallic luster pigment having a transparent or colored transparent film formed with a metal vapor deposition film of aluminum or the like, a metal pigment having a thickness of 0.01 to 0.1 μm obtained by releasing a vapor deposited metal film such as aluminum formed on a substrate such as a film, colloidal particles having an average particle size of 5 to 30 nm selected from gold, silver, platinum, and copper, fluorescent pigments, light-accumulating pigments, thermochromic pigments, and pearl pigments obtained by coating the surface of natural mica, synthetic mica, glass pieces, alumina, or transparent film pieces as the core substance with a metal oxide such as titanium oxide.

The pigments may be used alone or in combination of two or more kinds, and are used in the range of 3 to 40% by mass in the ink composition.

In addition, a general-purpose dye, for example, an organic solvent-soluble dye classified as a solvent dye in the color index can be used together with the pigment.

A volatile (low boiling point) organic solvent is preferably used as the organic solvent, and the handwriting is excellent in dryness even when written on a whiteboard. Therefore, when the handwriting is touched immediately after writing, good ink can be formed without causing problems such as undried ink adhering to the hand or contamination of the blank area on the writing surface where the handwriting is not formed.

The organic solvent includes a lower aliphatic alcohol-based solvent and a glycol ether-based solvent, which is preferably used as a main solvent (occupying 50% by weight or more of the entire solvent).

The lower aliphatic alcohol-based solvent includes aliphatic alcohol-based solvents having 2 to 4 carbon atoms, such as methyl alcohol, ethyl alcohol, n-propyl alcohol, and isopropyl alcohol. The glycol ether-based solvent includes glycol ether-based solvents having 4 to 6 carbon atoms, such as ethylene glycol monomethyl ether, ethylene glycol monoethyl ether, propylene glycol monomethyl ether, and propylene glycol monoethyl ether. More preferably, the lower aliphatic alcohol-based solvent is an aliphatic alcohol-based solvent having 2 to 4 carbon atoms, and the glycol ether-based solvent is a glycol ether-based solvent having 3 to 5 carbon atoms.

Among the above organic solvents, ethyl alcohol, n-propyl alcohol, and isopropyl alcohol are particularly preferable because they have high handwriting dryness and have good compatibility with the ink composition of the present invention.

In addition, another solvent can be used in combination with the organic solvent. The other solvents that can be used in combination include hydrocarbon organic solvents such as n-heptane, n-octane, isooctane, methylcyclohexane, ethylcyclohexane, toluene, xylene, and ethylbenzene, ketone-based organic solvents such as methyl isobutyl ketone, methyl n-propyl ketone, methyl n-butyl ketone, and di-n-propyl ketone, ester organic solvents such as dimethyl carbonate, ethyl methyl carbonate, diethyl carbonate, n-butyl formate, isobutyl formate, n-propyl acetate, isopropyl acetate, n-butyl acetate, isobutyl acetate, ethyl propionate, n-butyl propionate, methyl butyrate, ethyl butyrate, methyl lactate, and ethyl lactate, glycol-based solvents such as ethylene glycol, diethylene glycol, propylene glycol, and benzyl glycol, benzyl alcohol, and γ-butyrolactone.

The resin can be applied without particular limitation as long as it is soluble in the above organic solvents, and can be added to the ink for the purpose of improving the pigment dispersibility, suppressing the blurring of handwriting, improving the fixability, imparting the robustness, and the like.

Specifically, the resin includes ketone resins, amide resins, alkyd resins, rosin-modified resins, rosin-modified phenol resins, phenol resins, xylene resins, polyvinyl butyral resins, terpene-based resins, coumarone-indene resins, polyvinylpyrrolidone, polyethylene oxide, polymethacrylic acid ester, ketone-formaldehyde resins, α- and β-pinene•phenol polycondensation resins, polyvinyl butyral resins, acrylic resins, and polyacrylic acid polymethacrylic acid copolymers.

These resins may be used alone or as a mixture of two or more, and are used in the range of 0.1 to 5% by mass, and preferably 0.1 to 1% by mass in the ink composition.

The resin may be added in the form of processed pigment.

Among the above resins, polyvinyl butyral resin (PVB) is preferable because it exhibits handwriting fixability and pigment dispersion effects. Particularly, those having a butyralization degree of 55 to 85 mol % are preferable, and those having a butyralization degree of 58 to 70 mol % are more preferable. When the butyralization degree is within such a range, the compatibility of the release agent can be further increased, and it is more effective for preventing white blur under high humidity. Specifically, such resins include S-LEC BL-1, BL-1H, BL-2, BL-2H, BL-S, BX-L, BM-1, BM-2, BM-5, BM-S, BH-3, BX-1, and BX-5 (these are manufactured by SEKISUI CHEMICAL CO., LTD.), and MOWITAL B16H, B20H, B30T, B30H, B30HH, B45M, and B45H (these are manufactured by KURARAY CO., LTD.). These can be used alone or in combination of two or more kinds.

Moreover, in addition to the above components, if necessary, various additives can be used in the ink composition of the present invention, such as a handwriting density lowering inhibitor, a drying resistance imparting agent, a rust preventive, a viscosity modifier, a pigment dispersant, and a surfactant.

The additives are so-called conventional additives, and can be appropriately used from known compounds as needed.

The ink composition is put to practical use by being filled in a marking pen having a pen tip attached to the writing tip portion.

The structure and shape of the marking pen itself are not particularly limited, and the marking pen includes, for example, a marking pen having a structure of attaching the pen tip for marking pen such as fiber tip, felt tip, or plastic tip to the writing tip portion and impregnating ink into an ink occlusion body composed of a fiber bundle housed inside the barrel to supply the ink to the writing tip portion, a structure of storing ink directly inside the barrel and interposing a comb groove-shaped ink flow rate control member or an ink flow rate control member composed of a fiber bundle to supply a predetermined amount of ink to the writing tip portion, or a structure of directly storing ink in the barrel and supplying a predetermined amount of ink to the writing tip portion by the valve mechanism.

Note that the marking pen may be a cap type marking pen that has a cap covering the pen tip, as well as a retractable marking pen that has a retractable mechanism such as a knock type, a rotary type, or a slide type, and is capable of accommodating the pen tip in the barrel.

EXAMPLES

The table below presents the compositions of the oil-based ink compositions for a writing board of Examples and Comparative Examples. Note that the numerical values in the table are indicated in parts by mass.

TABLE 1

|  | Note | Example |  |  |  |  |  |  |  | Comparative Example |  |  |  |
|---|---|---|---|---|---|---|---|---|---|---|---|---|---|
|  |  | 1 | 2 | 3 | 4 | 5 | 6 | 7 | 8 | 1 | 2 | 3 | 4 |
| Black Processed Pigment | (1) | 8.0 |  |  |  |  |  |  |  | 8.0 |  |  |  |
| Blue Processed Pigment | (2) |  | 8.2 |  | 8.2 | 8.2 | 8.2 |  |  |  | 8.2 |  | 8.2 |
| Red Processed Pigment | (3) |  |  | 6.7 |  |  |  | 6.7 | 6.7 |  |  | 6.7 |  |
| Polyvinyl Butyral Resin A | (4) |  |  |  | 1.0 |  |  |  |  |  |  |  | 1.0 |
| Polyvinyl Butyral Resin B | (5) |  |  | 1.5 |  |  |  | 1.5 |  |  |  | 1.5 |  |
| Polyvinyl Butyral Resin C | (6) |  |  |  |  | 1.0 |  |  | 1.5 |  |  |  |  |
| Polyvinyl Butyral Resin D | (7) |  |  |  |  |  | 1.0 |  |  |  |  |  |  |
| Polyvinyl Acetal Resin | (8) |  |  |  |  |  |  | 1.0 | 1.0 |  |  |  |  |
| Release Agent A | (9) | 10.0 |  |  | 4.0 | 4.0 | 4.0 |  |  |  |  |  |  |
| Release Agent B | (10) |  | 5.0 |  | 4.0 | 4.0 | 4.0 |  |  |  |  |  |  |
| Release Agent C | (11) |  |  | 12.0 |  |  |  | 12.0 | 12.0 |  |  |  |  |
| Polyglycerin Stearate Ester |  | 1.0 | 1.0 | 1.0 | 1.0 | 1.0 | 1.0 | 1.0 | 1.0 | 1.0 | 1.0 | 1.0 | 1.0 |
| Cetyl Isooctanoate |  |  | 5.0 |  |  |  |  |  |  | 10.0 | 5.0 |  | 8.0 |
| Butyl Stearate |  |  |  |  | 2.0 | 2.0 | 2.0 |  |  |  | 5.0 | 12.0 | 2.0 |
| Ethyl Alcohol |  | 47.0 | 76.8 | 74.8 | 45.8 | 45.8 | 45.8 | 73.8 | 73.8 | 47.0 | 76.8 | 74.8 | 45.8 |
| Isoproyl Alcohol |  | 34.0 | 4.0 | 4.0 | 34.0 | 34.0 | 34.0 | 4.0 | 4.0 | 34.0 | 4.0 | 4.0 | 34.0 |

The contents of the raw materials are presented below according to the note numbers in the table.
(1) Processed pigment composed of 50% of C. I. Pigment Black 7 and 50% of polyvinyl butyral
(2) Processed pigment composed of 55% of C.I. Pigment Blue 60 and 45% of polyvinyl butyral
(3) Processed pigment composed of 45% of C.I. Pigment Red 58 and 55% of polyvinyl butyral
(4) manufactured by SEKISUI CHEMICAL CO., LTD. under the trade name: S-LEC BM-1 (butyralization degree 65±3 mol %, hydroxylation degree 34 mol %)
(5) manufactured by SEKISUI CHEMICAL CO., LTD. under the trade name: S-LEC BL-S (butyralization degree 74±3 mol %, hydroxylation degree 22 mol %)
(6) manufactured by SEKISUI CHEMICAL CO., LTD. under the trade name: S-LEC BL-1 (butyralization degree 63±3 mol %, hydroxylation degree 36 mol %)
(7) manufactured by SEKISUI CHEMICAL CO., LTD. under the trade name: S-LEC BL-1H (butyralization degree 69±3 mol %, hydroxylation degree 30 mol %)
(8) KURARAY CO., LTD. under the trade name: PIOLO-FORM BL-16
(9) A compound represented by the general formula (1), wherein $R^1$ and $R^2$ are in the ortho position and each of them is an isononyl group having 9 carbon atoms.
(10) A compound represented by the general formula (1), wherein $R^1$ and $R^2$ are in the para position and each of them is an ethoxydiglycol group having 6 carbon atoms and 2 oxygen atoms.
(11) A compound represented by the formula (2), wherein $R^3$ and $R^4$ are in the ortho position and each of them is an alkyl group having 8 carbon atoms.

Preparation of Ink

Components other than the release agent were put together with a solvent in a stirring container, and the mixture was stirred with 70 g of 2 mm glass beads at 20° C. for 2 hours with a high-speed blade type mixer. Thereafter, a release agent was added, and the mixture was stirred for 5 minutes, and then filtered through a mesh to remove the glass beads to obtain an ink composition.

Preparation of Marking Pen

An oil-based marking pen was obtained by filling a commercially available marking pen (manufactured by Pilot Corporation; WMBM-12L) with 5 g of each of the ink compositions of the above Examples and Comparative Examples.

The following tests were performed using each of the marking pens obtained.

Erasability Test

The marking pens were used to continuously write five spiral circles on various writing boards (whiteboards). The erasability of the handwriting immediately after writing and the handwriting after standing at 20° C. for 14 days was visually observed by moving a tissue paper mounted by a weight of 100 g on the handwriting.

As the writing board, a vitreous enamel plate having a surface gloss value of 70° gloss and a substrate surface coated with acrylic resin were used.

Writing Test

The state of handwriting after drying when 5 circles were continuously written with each marking pen on a transparent PET film under the environments of 20° C. and 80% humidity and 30° C. and 95% humidity was visually confirmed.

Cap-Off Test

Each of the marking pens confirmed to be writable was left horizontally for 1 day under the environment of 20° C., with the pen tip exposed to the air. Then, 12 spiral circles were continuously handwritten on a vitreous enamel writing board at room temperature. The state of handwriting at that time was visually confirmed.

The Table below presents the test results.

TABLE 2

| Erasability Test | Writing Board Material | Example |  |  |  |  |  |  |  | Comparative Example |  |  |  |
|---|---|---|---|---|---|---|---|---|---|---|---|---|---|
|  |  | 1 | 2 | 3 | 4 | 5 | 6 | 7 | 8 | 1 | 2 | 3 | 4 |
| Immediately After Writing | Vitreous Enamel | ○ | ○ | ○ | ○ | ○ | ○ | ○ | ○ | ○ | ○ | ○ | ○ |
|  | Acrylic Resin Coating | ○ | ○ | ○ | ○ | ○ | ○ | ○ | ○ | ○ | Δ | X | X |
| After 14 Days at 20° C. | Vitreous Enamel | ○ | ○ | ○ | ○ | ○ | ○ | ○ | ○ | X | Δ | Δ | X |
|  | Acrylic Resin Coating | ○ | ○ | ○ | ○ | ○ | ○ | ○ | ○ | X | X | X | X |

TABLE 2-continued

| Erasability Test | Writing Board Material | Example |   |   |   |   |   |   |   | Comparative Example |   |   |   |
|---|---|---|---|---|---|---|---|---|---|---|---|---|---|
|   |   | 1 | 2 | 3 | 4 | 5 | 6 | 7 | 8 | 1 | 2 | 3 | 4 |
| Writing Test | 20° C., Humidity 85% | ○ | ○ | ○ | ○ | ○ | ○ | ○ | ○ | X | X | X | X |
|   | 30° C., Humidity 95% | ◎ | ○ | ● | ◎ | ○ | ● | ○ | ◎ | X | X | X | X |
| Cap-Off Test |   | ○ | ○ | ○ | ○ | ○ | ○ | ○ | ○ | X | X | X | X |

Note that the evaluation of the symbols in the table is as follows.

Erasability Test
- ○: Handwriting can be erased by moving 3 times.
- Δ: Part of the handwriting remains after moving 3 times.
- X: Half or more of the handwriting cannot be erased and remains after moving 3 times.

Writing Test:
- ◎: Glossy and clear handwriting can be obtained.
- ○: Clear handwriting can be obtained.
- ●: Handwriting with matte tone but sufficient density can be obtained.
- X: Handwriting is whitely blurred and low in density, resulting in matte handwriting.

Cap-Off Test
- ○: No blurring occurred, or recovery occurred within 3 circles.
- X: Recovery does not occur within 3 circles, or writing is impossible.

The invention claimed is:

1. A marking pen incorporating an oil-based ink composition having high mark-erasability for a writing board, said oil-based ink composition comprising: a pigment; an organic solvent; a polyvinyl butyral resin; and one or more compounds selected from compounds represented by the following general formulas (1) and (2)

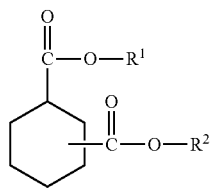

(1)

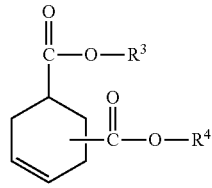

(2)

wherein $R^1$ to $R^4$ are each any of an alkyl group having 6 to 18 carbon atoms and an alkoxy polyglycol group having 2 to 18 carbon atoms and 2 to 10 oxygen atoms;

wherein a total content of the one or more compounds represented by the general formulas (1) and (2) is 1 to 15% by mass based on a total amount of the oil-based ink composition;

wherein a butyralization degree of the polyvinyl butyral resin is in a range of 55 to 85 mol %, and a hydroxylation degree of the polyvinyl butyral resin is in a range of 30 to 40 mol %;

wherein a content of the polyvinyl butyral resin is 0.1 to 5% by mass based on the total amount of the oil-based ink composition; and wherein the marking pen comprises a pen tip attached to a writing tip portion and a barrel storing the oil-based ink composition.

2. The marking pen according to claim 1, wherein the organic solvent is one or more selected from ethyl alcohol, n-propyl alcohol, and isopropyl alcohol.

* * * * *